(12) United States Patent
Burnham et al.

(10) Patent No.: US 6,357,037 B1
(45) Date of Patent: Mar. 12, 2002

(54) METHODS TO SECURELY CONFIGURE AN FPGA TO ACCEPT SELECTED MACROS

(75) Inventors: James L. Burnham, Morgan Hill; Gary R. Lawman; Joseph D. Linoff, both of San Jose, all of CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/232,022

(22) Filed: Jan. 14, 1999

(51) Int. Cl.⁷ .............................................. G06F 17/50
(52) U.S. Cl. ........................................................ 716/17
(58) Field of Search ............................................ 716/17

(56) References Cited

U.S. PATENT DOCUMENTS

| | | | |
|---|---|---|---|
| 3,849,760 A | 11/1974 | Endou et al. | 382/205 |
| 5,084,636 A | 1/1992 | Yoneda | 326/39 |
| RE34,363 E | 8/1993 | Freeman et al. | 326/38 |
| 5,237,218 A | 8/1993 | Josephson et al. | 326/41 |
| 5,237,219 A | 8/1993 | Cliff | 326/41 |
| 5,343,406 A | 8/1994 | Freeman, et al. | 326/40 |
| 5,394,031 A | 2/1995 | Britton et al. | 326/38 |
| 5,457,408 A | 10/1995 | Leung | 326/38 |
| 5,499,192 A * | 3/1996 | Knapp et al. | 716/17 |
| 5,705,938 A | 1/1998 | Kean | 326/39 |
| 5,946,478 A * | 8/1999 | Lawman | 716/17 |
| 6,216,259 B1 * | 4/2001 | Guccione et al. | 716/17 |

FOREIGN PATENT DOCUMENTS

| | | |
|---|---|---|
| EP | 0253530 | 6/1987 |
| WO | WO92/20157 | 11/1992 |
| WO | WO94/10754 | 11/1993 |
| WO | WO94/01867 | 1/1994 |

OTHER PUBLICATIONS

"The Programmable Logic Data Book", Published 1998, available from Xilinx, Inc., 2100 Logic Drive, San Jose, California 95124, pp. 4–46 to 4–59.
D. D. Gajski, et al., "Computer Architecture" IEEE Tutorial Manual, IEEE Computer Society, 1987, pp. v–i.
"New IEEE Standard Dictionary of Electrical and Electronics Terms", Fifth Edition, 1993, page 1011.
"IEEE Standard Test Access Port and Boundary–Scan Architecture", IEEE Std. 1149.1, published Oct. 21, 1993.
David A. Patterson and John L. Hennessy, "Computer Architecture: A Quantitive Approch", pp. 200–201, 1990.
Betty Prince, "Semiconductor Memories", copyright 1983, 1991, John Wiley & Sons, pp. 149–174.

(List continued on next page.)

Primary Examiner—Trong Phan
(74) Attorney, Agent, or Firm—Edward S. Mao; Lois D. Cartier (57) ABSTRACT

A method is provided for configuring an FPGA to accept or reject selected software (macros). Specifically, if an end user desires to use a locked macro from a first macro vendor a locked macro from a second macro vendor in the same FPGA, a key manager prepares a keyed FPGA for the end user by pre-programming an FPGA with a first key, which is configured to unlock the first locked macro, and a second key, which is configured to unlock the second locked macro. The key manager obtains the first key from the first macro vendor and the second key from the second macro vendor. The keys are stored in a key table of the FPGA that is write-only from outside the FPGA. The end user pays a fee to the key manager for the keyed macro, but is not given access to the keys. The key manager apportions the fee from the end user and distributes appropriate licensing fees to the first macro vendor and the second macro vendor.

22 Claims, 8 Drawing Sheets

OTHER PUBLICATIONS

Hodges, et al., "Analog MOS Integrated Circuits" IEEE Press, 1980, pp. 2–11.

"The Programmable Logic Data Book", published Sep., 1996, in its entirety and also specifically pp. 4–54 to 4–79 and 4–253 to 4–286, available from Xilinx, Inc., 2100 Logic Drive, San Jose, California 95124.

"Core Solutions Data Book", published May, 1997, pp. 2–5 to 2–13 available from Xilinx, Inc., 2100 Logic Drive, San Jose, California 95124.

"The Programmable Logic Data Book", published 1994, available from Xilinx, Inc., 2100 Logic Drive, San Jose, California 95124, pp. 2–105 to 2–132 and 2–231 to 2–238.

* cited by examiner

METHODS TO SECURELY CONFIGURE AN FPGA TO ACCEPT SELECTED MACROS

CROSS-REFERENCE TO RELATED APPLICATIONS

This application relates to concurrently filed, co-pending U.S. Pat. application Ser. No. 09/232,021, "METHODS TO SECURELY CONFIGURE AN FPGA TO ACCEPT SELECTED MACROS", by Burnham et al., owned by the assignee of this application and incorporated herein by reference.

This application relates to concurrently filed, co-pending U.S. Pat. application Ser. No. 09/231,528, "METHOD TO SECURELY CONFIGURE AN FPGA USING ENCRYPTED MACRO", by Burnham, owned by the assignee of this application and incorporated herein by reference.

This application relates to concurrently filed, co-pending U.S. Pat. application Ser. No. 09/231,912, "METHODS TO SECURELY CONFIGURE AN FPGA USING MACRO MARKERS", by Burnham et al., owned by the assignee of this application and incorporated herein by reference.

This application relates to U.S. Pat. application Ser. No. 09/000,519, entitled "DECODER STRUCTURE AND METHOD FOR FPGA CONFIGURATION" by Gary R. Lawman, which is also incorporated herein by reference.

FIELD OF THE INVENTION

The present invention relates to programmable devices such as field programmable gate arrays (FPGAs). More specifically, the present invention relates to methods for programming and enabling licensed macros in an FPGA.

BACKGROUND OF THE INVENTION

Due to advancing semiconductor processing technology, integrated circuits have greatly increased in functionality and complexity. For example, programmable devices such as field programmable gate arrays (FPGAs) and programmale logic devices (PLDs), can incorporate ever-increasing numbers of functional blocks and more flexible interconnect structures to provide greater functionality and flexibility.

Figure 1:
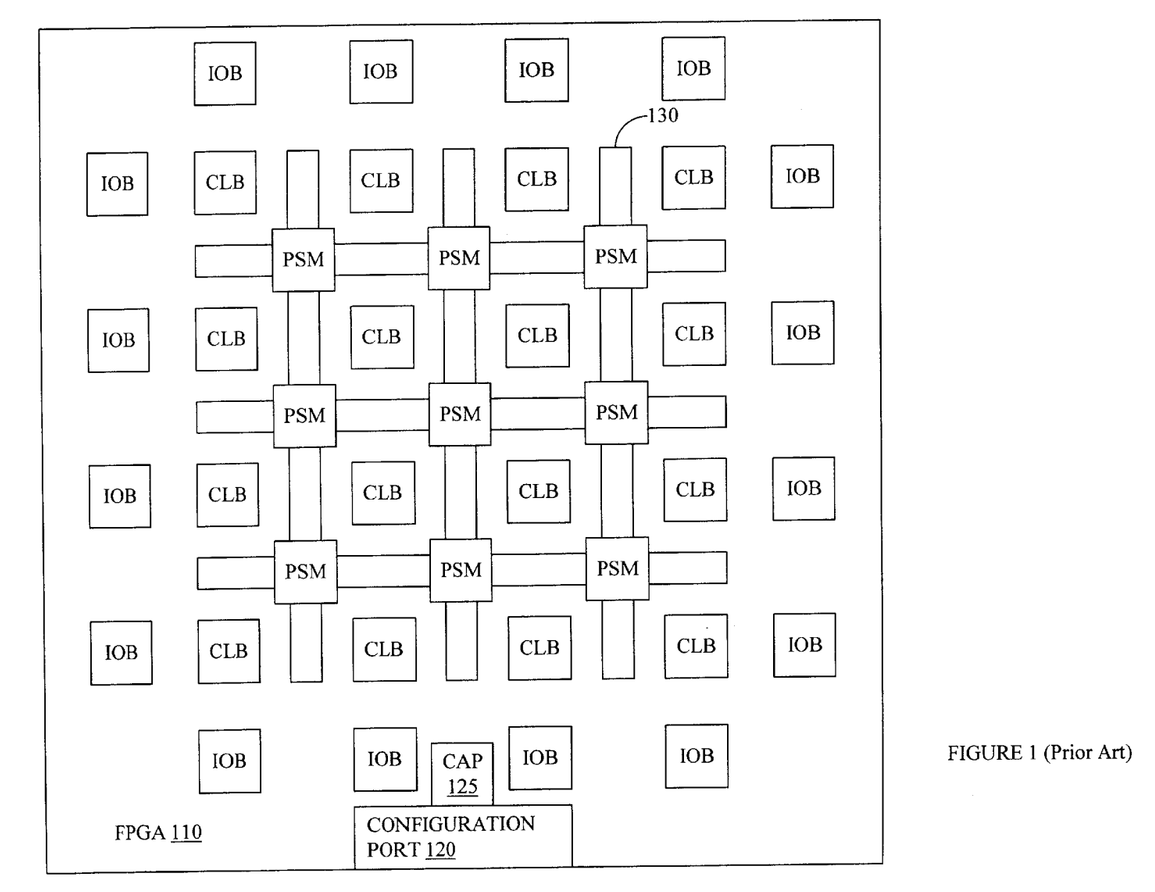
FIG. 1 is a simplified schematic diagram of a conventional FPGA.

FIG. 1 is a simplified schematic diagram of a conventional FPGA 110. FPGA 110 includes user logic circuits such as input/output blocks (IOBs), configurable logic blocks (CLBs), and programmable interconnect 130, which contains programmable switch matrices (PSMs). Each IOB and CLB can be configured through configuration port 120 to perform a variety of functions. Programmable interconnect 130 can be configured to provide electrical connections between the various CLBs and IOBs by configuring the PSMs and other programmable interconnection points (PIPS, not shown) through configuration port 120. Typically, the IOBs can be configured to drive output signals or to receive input signals from various pins (not shown) of FPGA 110.

FPGA 110 also includes dedicated internal logic. Dedicated internal logic performs specific functions and can only be minimally configured by a user. For example, configuration port 120 is one example of dedicated internal logic. Other examples may include dedicated clock nets (not shown), power distribution grids (not shown), and boundary scan logic (i.e. IEEE Boundary Scan Standard 1149.1, not shown).

FPGA 110 is illustrated with 16 CLBs, 16 IOBs, and 9 PSMs for clarity only. Actual FPGAs may contain thousands of CLBs, thousands of IOBs, and thousands of PSMs. The ratio of the number of CLBs, IOBs, and PSMs can also vary.

FPGA 110 also includes dedicated configuration logic circuits to program the user logic circuits. Specifically, each CLB, IOB, PSM, and PIP contains a configuration memory (not shown) which must be configured before each CLB, IOB, PSM, or PIP can perform a specified function. Some FPGAs may also include pre-configured logic circuits that are configured by the manufacturer to perform specific functions. For example, some FPGAs are pre-configured to include a PCI bus interface. Typically the configuration memories within an FPGA use static random access memory (SRAM) cells. The configuration memories of FPGA 110 are connected by a configuration structure (not shown) to configuration port 120 through a configuration access port (CAP) 125. A configuration port (a set of pins used during the configuration process) provides an interface for external configuration devices to program the FPGA. The configuration memories are typically arranged in rows and columns. The columns are loaded from a frame register which is in turn sequentially loaded from one or more sequential bit-streams. (The frame register is part of the configuration structure referenced above.) In FPGA 110, configuration access port 125 is essentially a bus that couples configuration port 120 to the configuration structure of FPGA 110.

Figure 2:
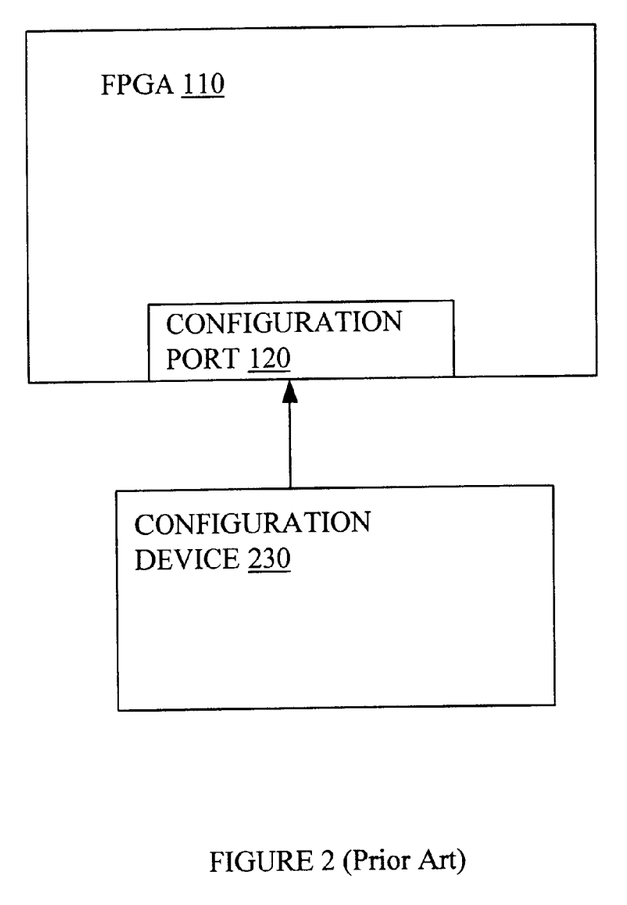
FIG. 2 is a prior art schematic diagram of an FPGA configured with a configuration device.

FIG. 2 illustrates a conventional method used to configure FPGA 110. Specifically, FPGA 110 is coupled to a configuration device 230 such as a serial programmable read only memory (SPROM), an electrically programmable read only memory (EPROM), or a microprocessor. Configuration port 120 receives configuration data, usually in the form of a configuration bitstream, from configuration device 230. Typically, configuration port 120 contains a set of mode pins, a clock pin and a configuration data input pin. Configuration data from configuration device 230 is transferred serially to FPGA 110 through the configuration data input pin. In some embodiments of FPGA 110, configuration port 120 comprises a set of configuration data input pins to increase the data transfer rate between configuration device 230 and FPGA 110 by transferring data in parallel. However, due to the limited number of dedicated function pins available on an FPGA, configuration port 120 usually has no more than eight configuration data input pins. Further, some FPGAs allow configuration through a boundary scan chain. Specific examples for configuring various FPGAs can be found on pages 4–46 to 4–59 of "The Programmable Logic Data Book", published in January, 1998 by Xilinx, Inc., and available from Xilinx, Inc., 2100 Logic Drive, San Jose, Calif. 95124, which pages are incorporated herein by reference. Additional methods to program FPGAs are described by Lawman in commonly assigned, co-pending U.S. patent application Ser. No. 09/000,519, entitled "DECODER STRUCTURE AND METHOD FOR FPGA CONFIGURATION" by Gary R. Lawman, which is referenced above.

As explained above, actual FPGAs can have thousands of CLBs, IOBs, PSMS, and PIPs; therefore, the design and development of FPGA software is very time-consuming and expensive. Consequently, many vendors provide macros for various functions that can be incorporated by an end user of the FPGA into the user's own design file. For example, Xilinx, Inc. provides a PCI interface macro, which can be incorporated by an end user into the user's design file. The user benefits from the macro because the user does not need to spend the time or resources to develop the macro. Further, since the vendor profits from selling the same macro to many users, the vendor can spend the time and resources to design optimized macros. For example, the vendor strives to provide macros having high performance, flexibility, and low gate count. However, the macro vendors are reluctant to give out copies of the design macros without a way of insuring that the design macros are used only by licensed users. Hence, there is a need for a method or structure to insure third party macros are used only by licensed end users.

SUMMARY OF THE INVENTION

The present invention uses on-chip keys, i.e., keys programmed into the chip, to unlock locked macros before the macros will function. Thus, macro vendors can freely distribute locked macros as long as the key to the macro is secure. A macro vendor locks a macro using a lock to create a locked macro. A corresponding key is placed within the FPGA in a write-only memory or a write and read once memory. (A read-once memory is a memory that can be read back only once, e.g., for manufacturing test purposes.) During configuration of the FPGA, a decoder detects the locked macro and uses the key to unlock the locked macro.

An FPGA in accordance with one embodiment of the present invention comprises a configuration port, a decoder coupled to the configuration port, a key table coupled to the decoder and the configuration port, and a configuration access port coupled to the decoder. In one embodiment the key table is a memory that is write-only from outside the FPGA. However, in another embodiment, the key table has visible header sections and invisible key sections. The visible header sections can be written to and read from outside the FPGA via the configuration port. The invisible key sections are write-only from outside the FPGA.

When an end user wishes to incorporate a locked macro from, a macro vendor, the macro vendor pre-programs a key into the key table of the FPGA. The end user creates a design file incorporating the locked macro. The design file is then converted into configuration data for the FPGA. The configuration data is sent into the configuration port of the FPGA. The on-chip decoder processes the configuration data and detects the locked macro. When the locked macro is detected, the decoder uses the key in the key table to unlock: the locked macro. If the key table does not contain a key able to unlock the locked macro, configuration of the FPGA fails. If additional locked macros are desired, the macro vendor can pre-program additional keys into the FPGA. Thus, a macro vendor can freely distribute the locked macros without concern of unlicensed use as long as the keys to the locked macro are secure.

In accordance with another embodiment of the present invention, multiple macro vendors can safely distribute locked macros. For example, if an end user desires a first locked macro from a first macro vendor and a second locked macro from a second macro vendor, a key manager can prepare the FPGA by pre-programming both a first key, which is configured to unlock the first locked macro, and a second key, which is configured to unlock the second locked macro, into the key table of an FPGA. The key manager obtains the first key from the first macro vendor and the second key from the second macro vendor. The key manager must keep the keys confidential and secured away from the end user. The locked macros can be freely distributed to the end user, since the end user must purchase the keyed FGPA, i.e., an FPGA having the appropriate keys, from the key manager. The key manager can distribute appropriate licensing fees to the macro vendors.

In accordance with another embodiment of the present invention, an end user is provided with a key programming tool. The key programming tool is used to pre-program keys into an FPGA. In one embodiment, encrypted keys are distributed to the end user. The end user uses the key programming tool, which is configured to obtain authorization from a macro vendor to use the key. The end user is never given access to the decrypted key. The key programming tool may also be configured to notify the macro vendor that a key is being pre-programmed, so that the macro vendor can collect the appropriate licensing fee. In another embodiment, the key programming tool obtains the keys directly from the macro vendor over a secure medium, such as a telephone line or an encrypted channel of a public network such as the internet.

Thus, the present invention advantageously enables macro vendors to freely distribute locked macros without losing licensing fees. Because the licensing fees are secured, macro vendors are motivated to rapidly introduce new and improved macros for end users. The present invention will be more fully understood in view of the following description and drawings.

DETAILED DESCRIPTION OF THE DRAWINGS

Figure 3:
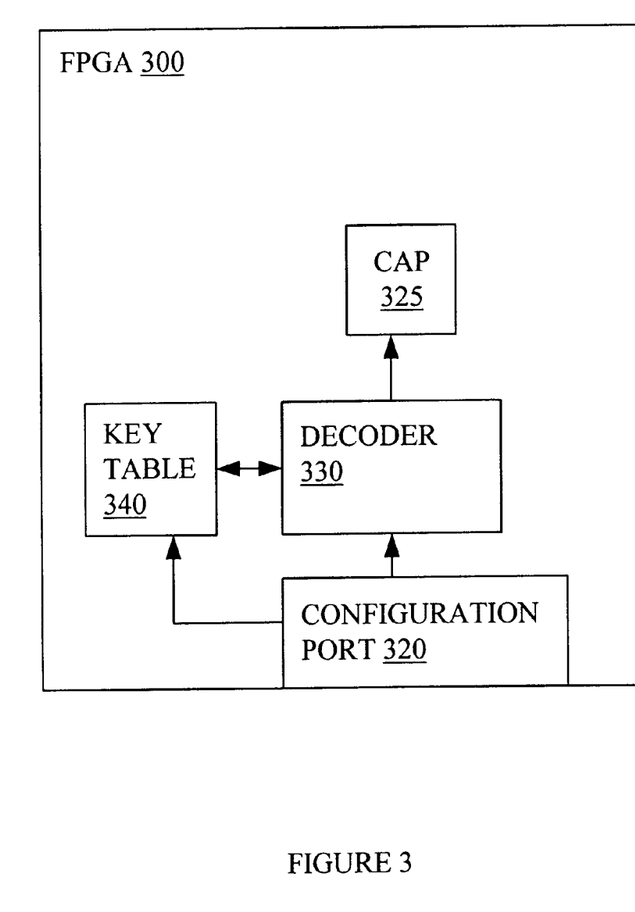
FIG. 3 is a schematic diagram of an FPGA in accordance with one embodiment of the present invention.

FIG. 3 is a block diagram of an FPGA 300 in accordance with one embodiment of the present invention. The FPGA of FIG. 3 comprises a configuration port 320, a decoder 330, a key table 340, and a configuration access port (CAP) 325. Other standard PLD features such as CLBS, IOBs, and PSMs are included in FPGA 300 but are omitted in FIG. 3 for clarity. Unlike conventional FPGAs, FPGA 300 routes the configuration data through decoder 330 before storing the configuration data into the configuration memories (not shown) of FPGA 300.

Decoder 330 processes the configuration data to locate locked macros. Locked macros are macros that are coded so that an FPGA can be programmed with the macro only if the FPGA was pre-programmed with the corresponding key. Alternatively, some locked macros can be loaded into an FPGA, but will only function if the FPGA contains the corresponding key. If decoder 330 detects a locked macro, decoder 330 attempts to use the pre-programmed keys from key table 340 to unlock the locked macro. If key table 340 contains an appropriate key, the locked macro is configured into FPGA 300 through configuration access port 325. In some embodiments, if no valid key is found in key table 340, decoder 330 causes a configuration error and halts the configuration of FPGA 300. In some embodiments the configuration of FPGA 300 proceeds to completion, but the locked macro does not function. Configuration data that is not part of a locked macro is stored in the appropriate configuration memories through configuration access port 325. A detailed example of configuring locked macros in FPGA 300 is explained below with respect to FIG. 5.

In some embodiments, public/private key encryption is used to lock the macros. As is well known in the art, in public/private key encryption a message is encrypted using a public key to form an encrypted message. The message can only be decrypted by a private key that corresponds to the public key. Thus, the public key can be freely distributed, while the private key must be kept secret. For the present invention, a macro can be encrypted using a public key. The macro is then combined with the public key or a header indicating which public key was used for encryption to form a locked macro. A specific private key, which corresponds to the public key, is required to decrypt the locked macro. Thus, decoder 330 requires that the specific private key is accessible in key table 340 to unlock the locked macro.

The public/private key system is not an integral part of the present invention. For example, some embodiments of the present invention use asymmetric (public key) cryptosystems such as the RSA (Rivest, Shamir, Adleman) algorithm (which are implemented in PGP) or DSA (Digital Signature Algorithm), where the key used for encryption (public) is different from the key used for decryption (private). Other embodiments use symmetric (conventional, "secret key") cryptosystems such as DES (Data Encryption Standard) or BLOWFISH, where the same key is used for both encryption and decryption. To avoid confusion, the terms public key and private key are not used further herein. Instead, the encrypting key is referred to as the lock, while the decrypting key is referred to simply as the key. The lock and the key (i.e., the encrypting and decrypting keys) may be the same or they may be different.

In one embodiment, key table 340 is a memory that is write-only from outside FPGA 300. Decoder 330 can read key table 340. However decoder 330 does not disclose the contents of key table 340 through configuration port 320. Thus, once a key is placed in key table 340 of FPGA 300, the key cannot be retrieved from FPGA 300. In one embodiment, key table 340 comprises FLASH RAM cells.

Figure 4:
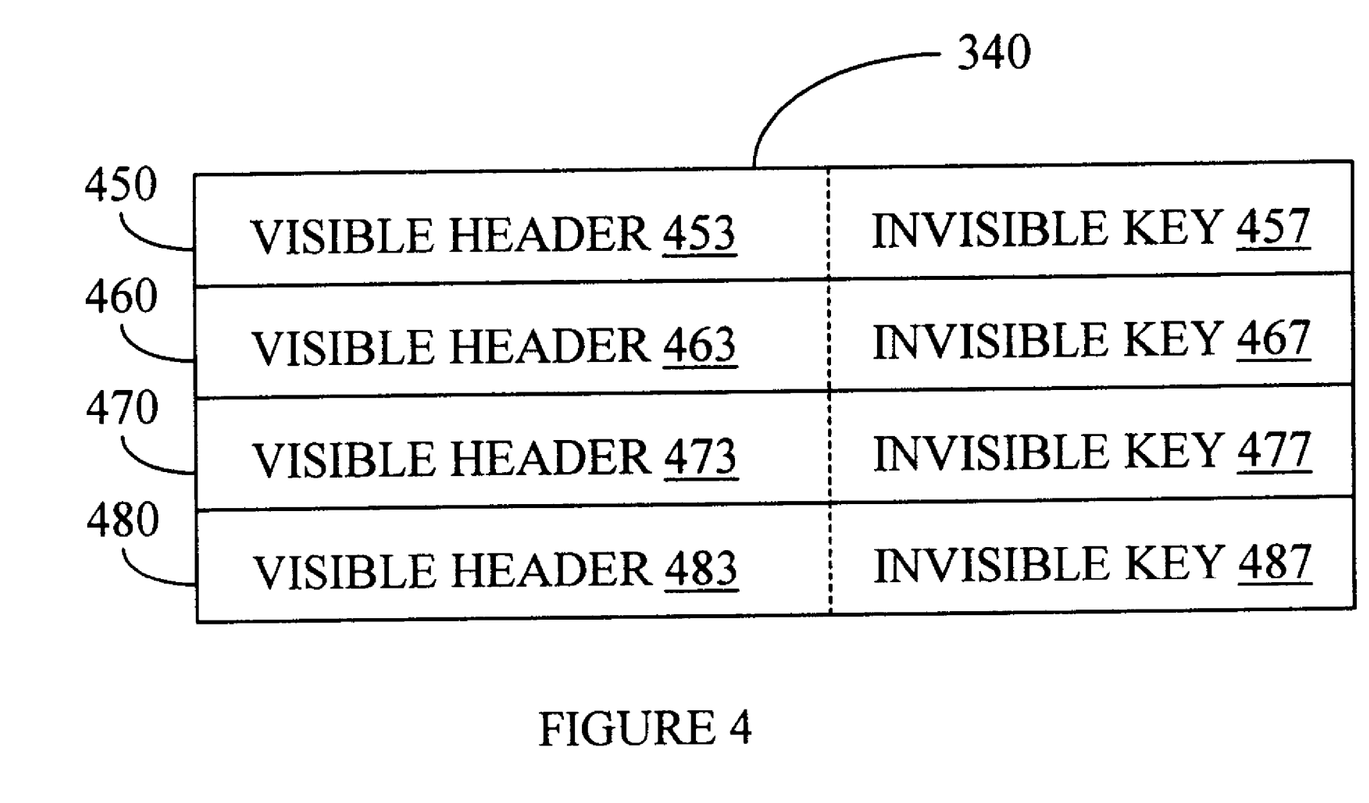
FIG. 4 is a block diagram of a key table in accordance with another embodiment of the present invention.

FIG. 4 is a block diagram of key table 340 in accordance with a second embodiment of the present invention. The embodiment of FIG. 4 comprises four key registers 450, 460, 470 and 480. Other embodiments of key table 340 may include hundreds or even thousands of key registers. Each key register comprises a visible header section and an invisible key section. Specifically, key register 450 has a visible header section 453 and an invisible key section 457. Similarly, key registers 460, 470, and 480 have visible header sections 463, 473, and 483, and invisible key sections 467, 477, and 487, respectively. Visible header sections 453, 463, 473, and 483 can be read from outside FPGA 300 through configuration port 320. However, invisible key sections 457, 467, 477, and 487 are write-only from outside FPGA 300. Thus, for the embodiment of FIG. 4, a key can be tagged by a visible header to identify the key, while the actual key remains hidden in the invisible key sections. In one embodiment, the visible header sections of key table 340 contain alpha-numeric description. For example, if the key for the Xilinx PCI macro is in invisible key section 457, visible header section 453 is pre-programmed with "Xilinx PCI Macro". Other embodiments use numeric codes to represent the macro vendor and the specific macro. Using a visible header allows an end user to determine which locked macros may be used with the FPGA.

In one embodiment, for large key tables, the visible header section is used as a content addressable memory to rapidly determine whether the key to a specific locked macro is stored in key table 340. Specifically, each locked macro contains information regarding the header of the appropriate key; for example, the numeric representation of the macro vendor and the numeric representation for the specific macro from the macro vendor. Decoder 330 (FIG. 3) can use the header information from the locked macro to address key table 340 to determine if the appropriate key resides in key table 340.

Figure 5:
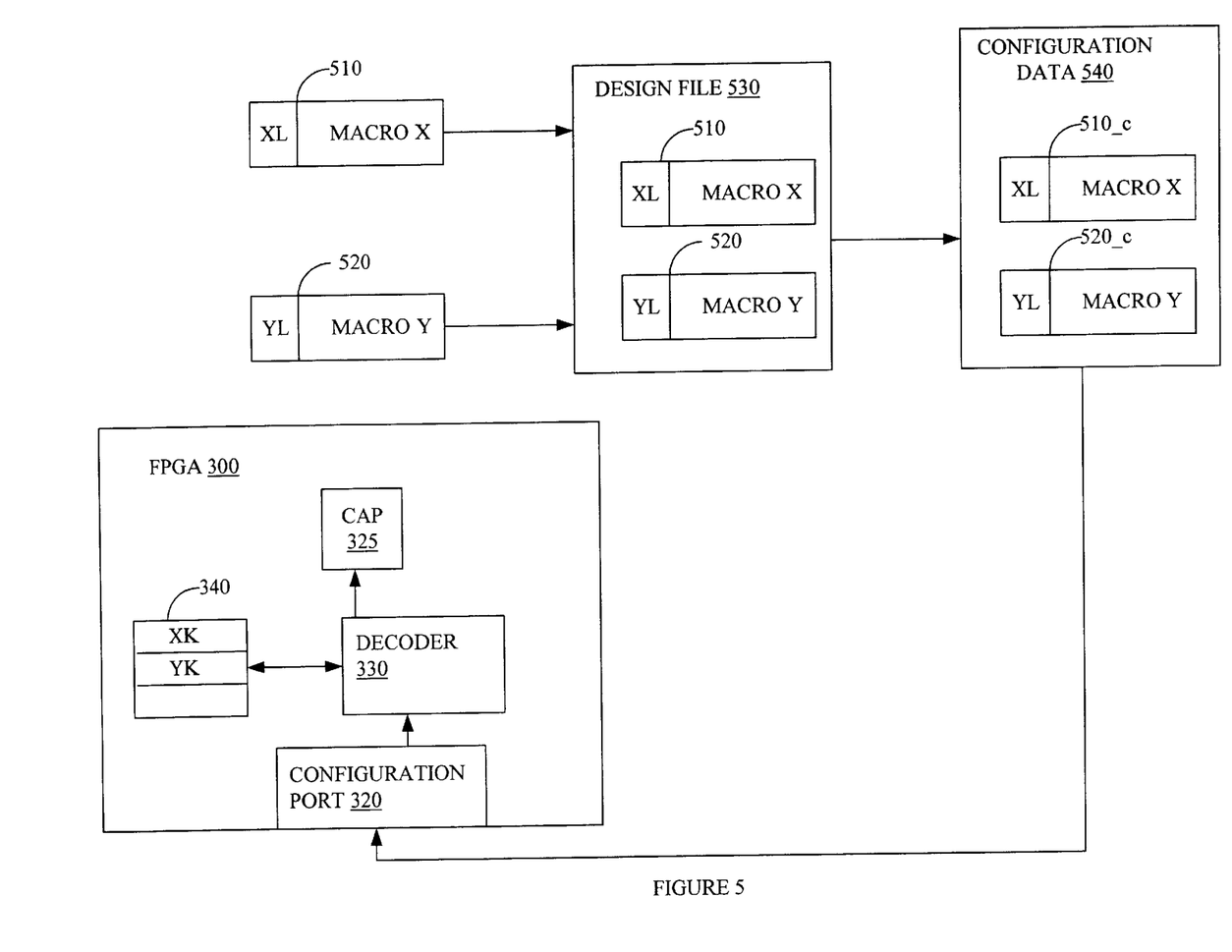
FIG. 5 illustrates a method of programming an FPGA in accordance with another embodiment of the present invention.

FIG. 5 illustrates how an FPGA is programmed with locked macros in accordance with one embodiment of the present invention. A user (not shown) desires to use macro X and macro Y in an FPGA design. The vendor of macro X and macro Y provides locked macro 510 and locked macro 520 to the user. Locked macro 510 comprises lock XL and macro X, which is encrypted using lock XL. Similarly, locked macro 520 comprises lock YL and macro Y, which is encrypted using lock YL. The user incorporates locked macros 510 and 520 into a design file 530. Design file 530 is converted into configuration data 540, which includes locked macro 510_c, which is the converted version of locked macro 510, and locked macro 520_c, which is the converted version of locked macro 520. The converted versions of the macros typically take the form of portions of a configuration bit stream, with the locks attached. Configuration data 540 is also typically a configuration bitstream.

Configuration data 540 is fed into FPGA 300 through configuration port 320. Decoder 330 processes configuration data 540 to determine if configuration data 540 contains any locked macros. When decoder 330 detects locked macro 510_c, decoder 330 accesses key table 340 to determine if key table 340 contains a key to unlock locked macro 510_c. In the example depicted in FIG. 5, key table 340 is pre-programmed to contain key XK which unlocks locked macro 510_c. As stated above, some embodiments encrypt macro X. For these embodiments, decoder 330 decrypts macro X using key XK. The specific encryption algorithm is not an integral part of the present invention. Similarly, when decoder 330 processes locked macro 520_c, decoder 330 uses key YK to unlock locked macro 520_c. If key XK or key YK was not pre-programmed in key table 340, configuration data 540 would fail to successfully configure FPGA 300.

Figure 6:
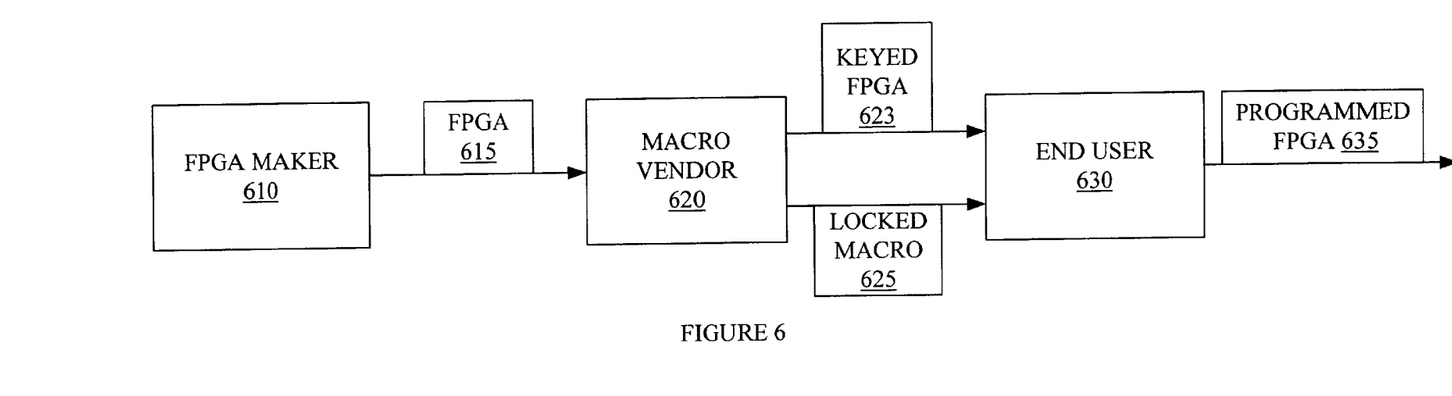
FIG. 6 illustrates a method of programming an FPGA in accordance with another embodiment of the present invention.

FIG. 6 illustrates a method for distributing and using a locked macro 625. As illustrated in FIG. 6, a macro vendor 620 obtains an FPGA 615 from an FPGA maker 610. To avoid unnecessary confusion, middle men, such as distributors and retailers, are omitted from FIG. 6. Macro vendor 620 pre-programs FPGA 615 with an appropriate key for locked macro 625 to form keyed FPGA 623. End user 630 purchases keyed FPGA 623 and locked macro 625 from macro vendor 620. End user 630 then creates a programmed FPGA 635 containing locked macro 625, using (for example) the method illustrated in FIG. 5. If macro vendor 620 provides multiple locked macros, each keyed FPGA can be customized for the end user to contain only keys for the specific locked macros desired by end user 630. Because locked macro 625 can only be used with a properly keyed FPGA, (e.g., keyed FPGA 623), and because macro vendor 620 has sole control over the key for locked macro 625, macro vendor 620 can prevent unlicensed end users from using locked macro 625. If an unlicensed user obtained a copy of locked macro 625, the unlicensed user still must obtain a properly keyed FPGA from macro vendor 620 to make use of locked macro 625. Thus, macro vendor 620 can freely distribute copies of locked macro 625. Furthermore, because end user 630 must purchase keyed FPGA 623 from macro vendor 620 to use locked macro 625, end user 630 cannot illicitly use locked macro 625 to produce unlicensed programmed FPGAs containing locked macro 625. Thus, by using the method of FIG. 6, macro vendor 620 can provide locked macros to end users without fear of unlicensed use. In addition, if an end user later decides that his design does not require locked macro 625, the end user can still use keyed FPGA 623 for his design.

Figure 7:
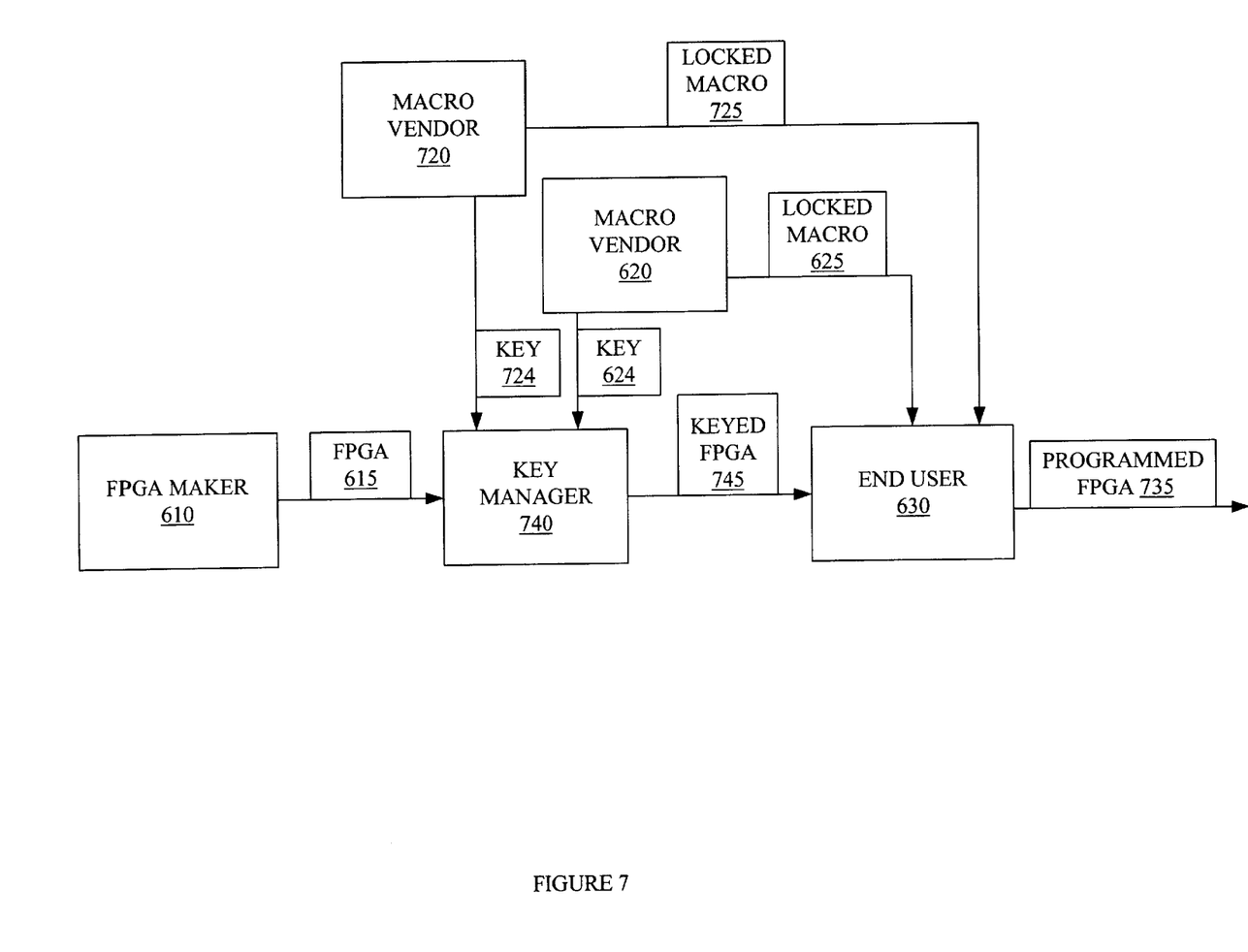
FIG. 7 illustrates a method of programming an FPGA in accordance with another embodiment of the present invention.

In many situations, an end user may wish to incorporate locked macros from multiple macro vendors into a single design file. FIG. 7 illustrates a method in accordance with one embodiment of the present invention to safely distribute and use locked macros for multiple macro vendors. As illustrated in FIG. 7, a key manager 740 obtains FPGA 615 from FPGA maker 610. Key manager 740 also obtains keys from various macro vendors, such as key 624 (for locked macro 625) from macro vendor 620 and key 724 (for locked macro 725) from macro vendor 720. End user 630 wishes to incorporate locked macros 625 and 725 into a design file. End user 630 can order keyed FPGA 745 from key manager 740. Key manager 740 pre-programs the appropriate keys (i.e., keys 724 and 624), into keyed PPGA 745, which is delivered to end user 630. An important duty of key manager 740 is to insure that keys obtained from various macro vendors are kept confidential. Furthermore, key manager 740 is usually responsible for collecting licensing fees for macro vendor 720 and macro vendor 620. Some FPGA makers may choose to perform the function of key manager 740 to better service macro vendors and end users.

End user 630 obtains locked macro 725 from macro vendor 720 and locked macro 625 from macro vendor 620. Thus, end user 630 has the desired locked macros for his design file and a properly keyed FPGA (i.e., keyed FPGA 745) to receive the design file. Thus, end user 630 can create a programmed FPGA 735, which implements locked macro 725 from macro vendor 720 and locked macro 625 from macro vendor 620.

Figure 8:
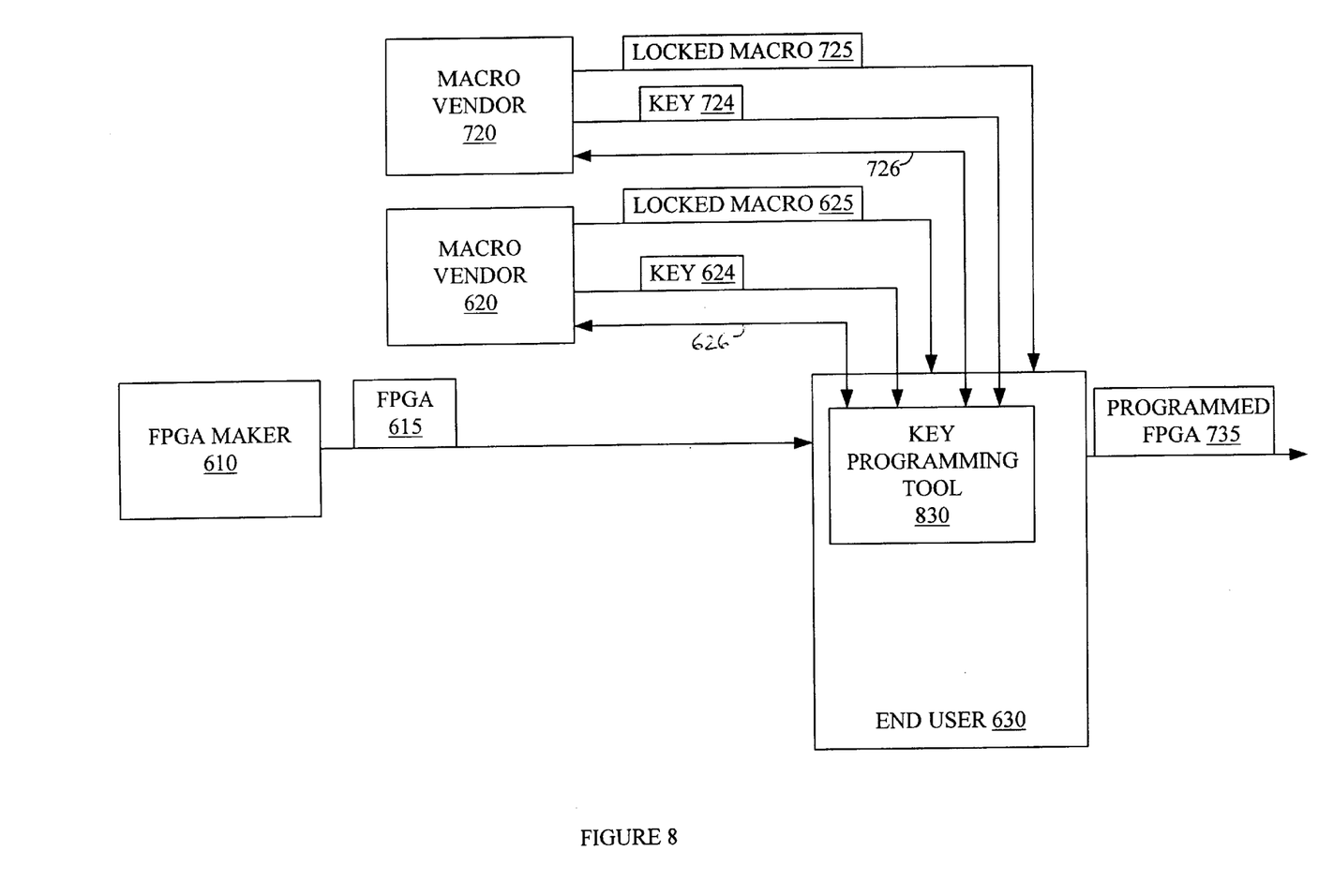
FIG. 8 illustrates a method of programming an FPGA in accordance with another embodiment of the present invention.

FIG. 8 illustrates a method in accordance with other embodiments of the present invention to safely distribute and use locked macros for multiple macro vendors. As illustrated in FIG. 8, end user 630 obtains FPGA 615 from FPGA maker 610. End user 630 also obtains locked macro 725 from macro vendor 720 and locked macro 625 from macro vendor 620. End user 630 uses a key programming tool 830 to pre-program the appropriate keys into FPGA 615.

In one embodiment, key programming tool contacts the appropriate macro vendor to obtain the desired key over a secure medium. For example, in FIG. 8, key programming tool 830 contacts macro vendor 620 to obtain key 624 over secure medium 626 and contacts macro vendor 720 to obtain key 724 over secure medium 726. The secure medium could be, for example, a telephone line to the macro vendors using modems, or an encrypted channel of a public network such as the internet.

In another embodiment, encrypted versions of keys 624 and 724 are distributed directly to end user 630. However, only key programming tool 830 can decrypt and pre-program FPGA 615 with keys 624 and 724. Key programming tool 830 is configured to contact macro vendor 620 to obtain approval from macro vendor 620 before pre-programming key 624 into FPGA 615. Alternatively, key programming tool 830 can be configured to notify macro vendor 620 each time an FPGA is pre-programmed with key 624. Similarly, key programming tool 830 is configured to contact macro vendor 720 before pre-programming FPGA 615 with key 724. After pre-programming FPGA 615 with keys 724 and 624, end user 630 can create programmed FPGA 735 using (for example) the method illustrated in FIG. 5.

In the various embodiments of this invention, methods and structures have been described to securely distribute and use third party macros. By locking a macro so that a key is required in the FPGA to use the macro, macro vendors prevent unlicensed use of macros. Furthermore, by using a key manager or a key programming tool, an end user can easily incorporate macros from different macro vendors in a single FPGA design file. By providing a secure method to distribute macros, macro vendors are motivated to expend the time and effort to create large libraries of optimized macros to sell to end users. Thus, the cost and time for creating design files for FPGAs by an end user can be reduced through the use of macros from macro vendors.

The various embodiments of the structures and methods of this invention that are described above are illustrative only of the principles of this invention and are not intended to limit the scope of the invention to the particular embodiments described. For example, in view of this disclosure, those skilled in the art can define other decoders, locked macros, keys, key tables, key programming tools, configuration devices, FPGAs, CLBs, IOBs, PSMs, configuration access ports, configuration ports, and so forth, and use these alternative features to create a method, circuit, or system according to the principles of this invention. Thus, the invention is limited only by the following claims.

What is claimed is:

1. A method to prepare an FPGA for use with a first locked macro from a first macro vendor and a second locked macro from a second macro vendor, the method comprising:

pre-programming a first key configured to unlock said first locked macro in a key table of said FPGA; and pre-programming a second key configured to unlock said second locked macro in said key table of said FPGA.

2. The method of claim 1, further comprising:

obtaining said first key from said first macro vendor; and obtaining said second key from said second macro vendor.

3. The method of claim 1, wherein said first key comprises a header section and a key section.

4. The method of claim 3, wherein the step of pre-programming a first key comprises:

storing said header section of said first key in a visible header section of said key table; and storing said key section of said first key in an invisible key section of said key table.

5. A method for programming an FPGA to use a first locked macro and a second locked macro, the method comprising:

obtaining said first locked macro from a first macro vendor;

obtaining said second locked macro from a second macro vendor; and obtaining a keyed FPGA from a key manager, said keyed FPGA comprising a key table containing a first key configured to unlock said first locked macro and a second key configured to unlock said second macro.

6. The method of claim 5, further comprising creating a design file incorporating said first locked macro and said second locked macro.

7. The method of claim 6, further comprising:
converting said design file into configuration data; and
configuring said keyed FPGA with said configuration data.

8. A method of programming an FPGA to use a locked macro, the method comprising:
obtaining a first locked macro from a first macro vendor;
obtaining a first key configured to unlock said first locked macro from said first macro vendor over a secure medium; and
pre-programming said first key into a key table of said FPGA.

9. The method of claim 8, further comprising:
creating a design file incorporating said first locked macro;
converting said design file into configuration data; and
configuring said FPGA with said configuration data.

10. The method of claim 8, wherein said secure medium is a telephone line.

11. The method of claim 8, wherein said secure medium is an encrypted channel of a public network.

12. A method of programming an FPGA to use a locked macro, the method comprising:
obtaining a first locked macro from a first macro vendor;
obtaining a first encrypted key from said first macro vendor, wherein said first encrypted key is configured to unlock said first locked macro;
decrypting said first encrypted key to create a first decrypted key; and
pre-programming said first decrypted key into a key table of said FPGA.

13. The method of claim 12, further comprising receiving authorization from said first macro vendor to pre-program said first decrypted key into said key table.

14. The method of claim 12, further comprising notifying said first macro vendor prior to the creation of said first decrypted key.

15. The method of claim 12, wherein the step of decrypting said first encrypted key and the step of pre-programming said first decrypted key into a key table of said FPGA are performed by a key programming tool.

16. The method of claim 15, wherein said decrypted key is not revealed by said key programming tool.

17. The method of claim 12, further comprising:
obtaining a second locked macro from a second macro vendor;
obtaining a second encrypted key from said second macro vendor, wherein said second encrypted key is configured to unlock said second locked macro;
decrypting said second encrypted key to create a second decrypted key; and
pre-programming said second decrypted key into said key table of said FPGA.

18. A method to distribute macros for an FPGA, the method comprising:
locking a first macro using a first lock to create a first locked macro; and
pre-programming said FPGA with a first key configured to unlock said first locked macro to create a keyed FPGA.

19. The method of claim 18, further comprising:
distributing said first locked macro to an end user; and
distributing said keyed FPGA to said end user.

20. The method of claim 18, further comprising:
locking a second macro using a second lock to create a second locked macro; and
pre-programming said FPGA with a second key configured to unlock said second locked macro.

21. The method of claim 18, wherein the step of locking a first macro comprises encrypting said first macro with said first lock.

22. The method of claim 21, wherein said first key is used to decrypt said first locked macro.

* * * * *